(12) United States Patent
Shin

(10) Patent No.: US 11,261,065 B2
(45) Date of Patent: Mar. 1, 2022

(54) LIFTING APPARATUS FOR HIGHLY-MOUNTED DEVICE

(71) Applicant: REEL TECH CO., LTD., Suncheon-si (KR)

(72) Inventor: Jeong Hoon Shin, Suncheon-si (KR)

(73) Assignee: Reel Tech Co., Ltd., Suncheon-si (KR)

(*) Notice: Subject to any disclaimer, the term of this patent is extended or adjusted under 35 U.S.C. 154(b) by 54 days.

(21) Appl. No.: 16/759,047

(22) PCT Filed: Oct. 26, 2018

(86) PCT No.: PCT/KR2018/012797
§ 371 (c)(1),
(2) Date: Apr. 24, 2020

(87) PCT Pub. No.: WO2019/083314
PCT Pub. Date: May 2, 2019

(65) Prior Publication Data
US 2020/0317478 A1     Oct. 8, 2020

(30) Foreign Application Priority Data

Oct. 27, 2017   (KR) .................. 10-2017-0141517
Aug. 3, 2018    (KR) .................. 10-2018-0090971

(51) Int. Cl.
*B66D 1/48*   (2006.01)
*B66D 1/36*   (2006.01)
(Continued)

(52) U.S. Cl.
CPC ............... *B66D 1/48* (2013.01); *B66D 1/12* (2013.01); *B66D 1/34* (2013.01); *B66D 1/36* (2013.01);
(Continued)

(58) Field of Classification Search
CPC ..... H04N 5/2253; F21V 21/38; A62C 99/009; B66D 2700/025; B66D 1/12; B66D 1/34;
(Continued)

(56) References Cited

U.S. PATENT DOCUMENTS 6,520,484 B1     2/2003  Shimizu et al.
10,502,362 B2 *  12/2019 Shin ................. H04N 5/2253
(Continued)

FOREIGN PATENT DOCUMENTS

CN          1345691 A       4/2002
CN        101421176 A       4/2009
(Continued)

OTHER PUBLICATIONS

International Search Report of corresponding PCT Application No. PCT/KR2018/012797—4 pages (dated Feb. 19, 2019).

*Primary Examiner* — Michael E Gallion
(74) *Attorney, Agent, or Firm* — Knobbe Martens Olson & Bear LLP

(57) ABSTRACT

A lifting apparatus for a highly-mounted device includes a main body installed at a predetermined height so that a drum for winding a wire rope and a first driving motor for giving a rotating force to the drum are installed thereto; a lifting body suspended from the wire rope and having a device coupling portion provided at a lower end thereof; an accommodation structure located at a lower portion of the main body and having an open lower portion so as to be coupled with the lifting body; a stopper installed at the accommodation structure and caught by a suspending protrusion provided to the lifting body to give an anti-falling function for the lifting body; and an upper contact point and a lower contact point respectively installed at the main body and the lifting body to make contact with each other when the lifting body is moved up.

4 Claims, 6 Drawing Sheets

(51) Int. Cl.
 *B66D 1/34* (2006.01)
 *B66D 1/56* (2006.01)
 *B66D 1/60* (2006.01)
 *B66D 1/12* (2006.01)
 *B66D 1/54* (2006.01)
 *A62C 99/00* (2010.01)
 *F21V 21/38* (2006.01)
 *H04N 5/225* (2006.01)

(52) U.S. Cl.
 CPC ............... *B66D 1/54* (2013.01); *B66D 1/56* (2013.01); *B66D 1/60* (2013.01); *A62C 99/009* (2013.01); *B66D 2700/025* (2013.01); *F21V 21/38* (2013.01); *H04N 5/2253* (2013.01)

(58) Field of Classification Search
 CPC ... B66D 1/48; B66D 1/54; B66D 1/56; B66D 1/60
 See application file for complete search history.

(56) References Cited

U.S. PATENT DOCUMENTS

| | | | |
|---|---|---|---|
| 2004/0012969 | A1 | 1/2004 | Sin |
| 2005/0230670 | A1* | 10/2005 | Kataoka ................ B66D 1/36 254/335 |
| 2008/0217460 | A1 | 9/2008 | Shin |
| 2010/0051767 | A1* | 3/2010 | Erel ..................... B66C 23/02 248/205.1 |
| 2017/0009937 | A1* | 1/2017 | Shin ..................... H04N 5/2253 |

FOREIGN PATENT DOCUMENTS

| | | |
|---|---|---|
| CN | 201439929 U | 4/2010 |
| CN | 202322245 U | 7/2012 |
| CN | 202449775 U | 9/2012 |
| CN | 10674409 A | 5/2017 |
| CN | 106744409 A | 5/2017 |
| CN | 206156653 U | 5/2017 |
| FR | 2683617 A1 | 5/1993 |
| JP | 05-028816 A | 2/1993 |
| JP | 08-129906 A | 5/1996 |
| JP | H08-192995 A | 7/1996 |
| JP | H09-104592 A | 4/1997 |
| JP | H10-59700 A | 3/1998 |
| JP | 2000-016766 A | 1/2000 |
| JP | 2009-202976 A | 9/2009 |
| JP | 2010-100423 A | 5/2010 |
| JP | 4746509 B2 | 8/2011 |
| JP | 4819578 B2 | 11/2011 |
| KR | 10-0679998 B1 | 2/2007 |
| KR | 10-0726578 B1 | 6/2007 |
| KR | 10-0908039 B1 | 7/2009 |
| KR | 10-2010-0024884 A | 3/2010 |
| KR | 10-1056847 B1 | 8/2011 |
| KR | 10-1184989 B1 | 10/2012 |
| KR | 10-1589715 B1 | 1/2016 |
| WO | 2007/133032 A1 | 11/2007 |

* cited by examiner

LIFTING APPARATUS FOR HIGHLY-MOUNTED DEVICE

TECHNICAL FIELD

The present application claims priority to Korean Patent Application No. 10-2017-0141517 filed on Oct. 27, 2017 and Korean Patent Application No. 10-2018-0090971 filed on Aug. 3, 2018 in the Republic of Korea, the disclosures of which are incorporated herein by reference.

The present disclosure relates to a lifting apparatus for a highly-mounted device, and more particularly, to a lifting apparatus for a highly-mounted device, which has a structure for moving the highly-mounted device upward or downward by winding or releasing a wire rope around a drum.

BACKGROUND ART

In general, a so-called highly-mounted light is installed at a hotel lobby, a factory ceiling, a gymnasium and a streetlight. The highly-mounted light is mainly equipped with a sodium light bulb or a mercury light bulb, and the life of the highly-mounted light is limited to 5000 to 6000 hours and should be changed periodically. In addition, the highly-mounted lights installed in service companies such as hotel lobbies and wedding halls need to replace light bulbs along with periodic cleaning for keeping exterior and exhibition effects.

Since the highly-mounted light is located at a height of 7 to 10 m in the case of a streetlight, an aerial crane or a ladder truck equipped with a basket should be used for cleaning or replacing the light bulb of the highly-mounted light. In addition, in a wedding hall, a hotel lobby, or the like, which has a relatively low height, a ladder is installed to clean or replace the light bulb, but in this case, there is a risk of accidents caused by falling. Moreover, at least three persons should be working in a group to carry out the cleaning or replacing work. Further, since large work facilities such as a crane and a ladder truck are used in the work place for the highly-mounted light, the work time is delayed and the work space is increased. Thus, when repairing or replacing highly-mounted light, a factory line should be stopped or the gym gymnasium cannot be used for a long time, so the repairing or replacing work should be finished quickly. In particular, when the streetlight is required or replaced, a cargo crane occupies one lane, thereby causing problems such as traffic jams.

As an alternative, a working method using a highly-mounted light, in which the highly-mounted light is lowered to the ground where a worker is located and then raised and fixed to the ceiling again, without working at a high spot where the highly-mounted light is located, and a device for the working method have been consistently developed.

As a device for lowering the highly-mounted light attached to the ceiling to the ground, there are proposed a manual lifting device for a highly-mounted light, in which a wire rope is fixed to the light and the wire rope is wound on a pulley fixed to the ground via the ceiling so that a user lifts the highly-mounted light by manipulating a handle bar connected to the pulley, and an automatic lifting device for a highly-mounted light, which uses a driving motor instead of the handle bar.

In general, the automatic lifting device for a highly-mounted light includes a socket (main body) fixed at a given height on the ceiling, a light fitting (lifting body) inserted into the socket to make a point contact with the socket and having a lower side to which a light bulb is mounted, a wire rope having one end fixed on an upper side of the light fitting and the other end provided on a drum installed at a predetermined location of the socket in a state of being wound by a predetermined length, and a driving motor configured to automatically wind unwind the wire rope on the drum according to the selection of a user to move the light fitting upward or downward.

The technique related to the configuration of unwinding and winding the wire rope in the automatic lifting device for a highly-mounted light is disclosed in, for example, Korean Patent No. 10-1056847. The lifting device for a highly-mounted light disclosed in Korean Patent No. 10-1056847 includes a sensing plate, which is pushed in the outer direction of a drum as the layer of wire rope wound around the drum increases, and a drive switch pressed by the contact of the sensing plate when the sensing plate is pushed to a set position to stop the operation of the driving unit for rotating the drum, wherein the drum is arranged to be placed in a standing state in the main body.

When the highly-mounted light is completely installed, the lifting body is caught by a stopper located at a lower end thereof to keep its fixed state. However, this structure is vulnerable since the lifting body may be easily shaken by external forces such as wind and vibration in a state where the lifting body is caught by the stopper. If the lifting body is shaken by the wind, the highly-mounted light is also shaken simultaneously, which may degrade the function. Also, if a strong wind is applied, the highly-mounted light may fall.

This problem also appears in a lifting-type CCTV camera system. In other words, the camera is shaken along with the lifting body due to the wind, the shooting may not be performed properly, and the camera may fall due to the strong wind.

DISCLOSURE

Technical Problem

The present disclosure is designed to solve the problems of the related art, and therefore the present disclosure is directed to providing a lifting apparatus for a highly-mounted device, which has a structure for stably fixing the highly-mounted device so that the highly-mounted device is not shaken by an external force such as wind in a state where the highly-mounted device such as a highly-mounted light or CCTV camera is completely installed.

Technical Solution

In one aspect of the present disclosure, there is provided a lifting apparatus for a highly-mounted device, comprising: a main body installed at a predetermined height so that a drum for winding a wire rope and a first driving motor for giving a rotating force to the drum are installed thereto; a lifting body suspended from the wire rope and having a device coupling portion provided at a lower end thereof; an accommodation structure located at a lower portion of the main body and having an open lower portion so as to be coupled with the lifting body; a stopper installed at the accommodation structure and caught by a suspending protrusion provided to the lifting body to give an anti-falling function for the lifting body; an upper contact point and a lower contact point respectively installed at the main body and the lifting body to make contact with each other when the lifting body is moved up and coupled to the main body by winding the wire rope; at least one guide roll disposed at a side portion and an upper portion of the drum to support the wire rope unwound from the drum and guide the unwound wire rope into the accommodation structure; and a fixing instrument configured to apply a force to any one of the upper contact point and the lifting body in a state where the lifting body is moved up and coupled to the main body by winding the wire rope, so that the lifting body comes into close contact with the stopper.

The fixing instrument may include a second driving motor fixed to the main body, and a screw bolt rotated by the second driving motor and coupled to a screw nut to be movable forward and backward in an upper and lower direction or in a left and right direction, and when the screw bolt moves forward, the screw bolt may compress the lifting body, or a portion connected to the lifting body, to push the lifting body downward so that the lifting body comes into close contact with the stopper.

The fixing instrument may be provided in plural, and the plurality of fixing instruments may be arranged at sides of the main body symmetrically based on the center of the main body to operate simultaneously.

When fixing the lifting body, the fixing instrument may instantly operate the second driving motor with a first power that is a high power so that the screw bolt starts moving downward, and then the fixing instrument may move the screw bolt downward with a second power that is a relatively low power to press the lifting body, and when releasing the fixation of the lifting body, the fixing instrument may instantly operate the second driving motor with the first power that is a high power so that the screw bolt starts moving upward, and then the fixing instrument may move the screw bolt upward with the second power that is a relatively low power to restore the screw bolt.

At least one selected from a CCTV camera, a light, a fire detector and a promotional banner may be coupled to the device coupling portion.

Advantageous Effects

According to the present disclosure, when the highly-mounted device is completely installed, the lifting body is in close contact with the stopper by the fixing instrument, which prevents the lifting body from shaking and reduces the risk of performance deterioration or fall of the highly-mounted device.

In addition, since the lifting body is prevented from shaking by the fixing instrument, it is possible to improve the contact reliability between the upper contact point and the lower contact point.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
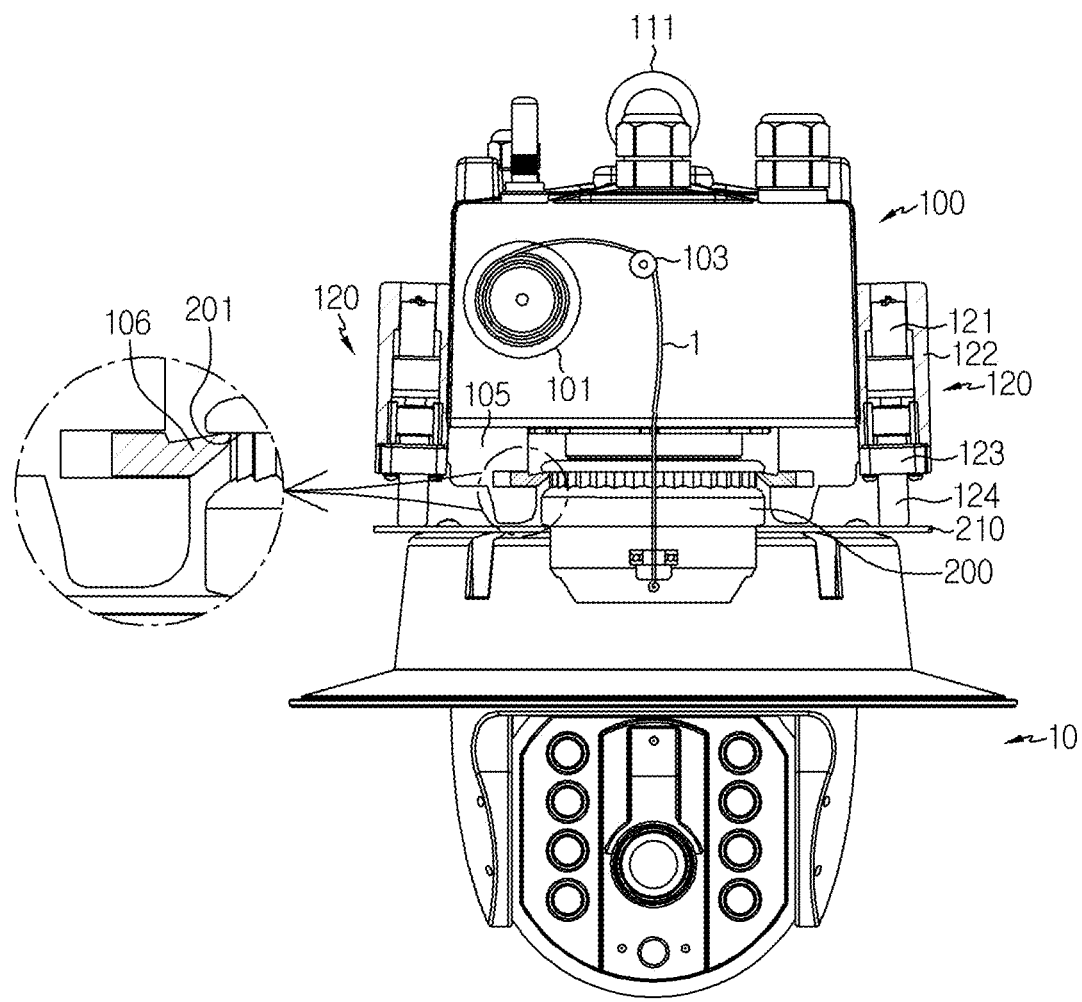
FIG. 1 is a side view showing a lifting apparatus for a highly-mounted device according to a preferred embodiment of the present disclosure.

FIG. 1 is a side view showing a lifting apparatus for a highly-mounted device according to a preferred embodiment of the present disclosure.

Referring to FIG. 1, the lifting apparatus for a highly-mounted device according to a preferred embodiment of the present disclosure includes a main body 100 installed at a predetermined height so that a drum 101 is installed therein, a coupling unit located at a lower portion of the main body 100 and having a stopper 106 capable of being caught by the lifting body 200, a lifting body 200 suspending from a wire rope 1 wound on the drum 101 and having a device coupling portion 204 formed at a lower end thereof so that a highly-mounted device is mounted thereto, an upper contact point 109 installed at the main body 100, a lower contact point 202 disposed at an upper portion of the lifting body 200 to contact the upper contact point 109 when the lifting body 200 is moved upward and coupled to the main body 100 through the coupling unit, a plurality of guide rolls 103 for supporting and guiding the wire rope 1, and a fixing instrument 120 installed at the main body 100 to closely contact the lifting body 200 with the stopper 106.

The main body 100 is installed at a predetermined height at an upper end of a supporting structure such as the ceiling of a building or a streetlamp. For the installation of the main body 100, a mounting member 111, for example, made of a ring bolt is provided at an upper end of the main body 100. Alternatively, the main body 100 may be connected to a predetermined support bracket (not shown) that may be coupled to a predetermined H beam provided on the ceiling of the building.

In the main body 100, a drum 101 around which the wire rope 1 may be wound and a first driving motor (not shown) coupled to the drum 101 through a predetermined gear assembly to provide a forward and reverse rotating force. A geared motor is preferably adopted as the first driving motor. The technical configuration of transmitting the rotating force of the first driving motor to the drum 101 arranged horizontally using the gear assembly is disclosed in detail in Korean Patent Application No. 10-2013-0070072 filed by the applicant of this application.

The drum 101 is a cylindrical bobbin that is capable of winding and unwinding the wire rope 1. Though it is shown that the drum 101 is disposed to stand upright, it is also possible that the drum 101 is rotatably installed in the main body 100 in a state of laying down so that its hollow is opened substantially vertically with respect to the ground.

In order to mediate the coupling between the main body 100 and the lifting body 200, a coupling unit having an accommodation structure 105 with a hollow is formed to a lower portion of the main body 100.

The coupling unit is located at the lower portion of the main body 100 and serves to mediate the coupling of the lifting body 200 at a correct position of the main body 100 when the lifting body 200 is moved up to a given point by winding the wire rope 1. Specifically, the coupling unit includes an accommodation structure 105 having a predetermined shape and guiding the lifting body 200 to be aligned at the lower portion of the center of the main body 100, and a stopper 106 selectively caught by a suspending protrusion 201 having a suspending protrusion shape and formed on an upper end of the lifting body 200 to fix the coupling state of the lifting body 200 to the main body 100.

The receiving structure 105 has a cylindrical shape having an open lower portion and having an inner space through which at least an upper portion of the lifting body 200 may move in and out. The receiving structure 105 may be integrally formed with the main body 100. Alternatively, the receiving structure 105 may be formed as a separate member from the main body 100 and detachably coupled to the lower portion of the main body 100.

The stopper 106 is installed to be accessible to selectively protrude from an inner wall of the accommodation structure 105 and fixes the position of the lifting body 200 fitted into the accommodation structure 105. The stopper 106 may be provided in a pair such that the pair of stoppers 106 are installed to face each other based on the center of the accommodation structure 105. Alternatively, a plurality of stoppers 106 may be installed at regular intervals in the circumferential direction.

The stopper 106 has a wedge-shaped body with a front lower surface inclined with a slope and is installed to protrude from the inner wall surface of the accommodation structure 105 selectively by, for example, a driving means such as a solenoid.

The lifting body 200 is installed to be suspended from the wire rope 1 and is lifted up and down simultaneously with winding and unwinding the wire rope 1. A device coupling portion of a predetermined type is provided to the lower portion of the lifting body 200, and a highly-mounted device is coupled to the device coupling portion. As the highly-mounted device, various devices such as a CCTV camera shown in the figures, a light, a fire detector and a promotional banner may be employed.

The suspending protrusion 201 corresponding to the stopper 106 is formed at an upper end of the outer surface of the lifting body 200. The stopper 106 is coupled to a groove portion of the suspending protrusion 201 to fix the position of the lifting body 200.

The wire rope 1 unwound from the drum 101 extends below the main body 100 and is connected to the lifting body 200. To this end, a plurality of guide rolls 103 are arranged around the drum 101 to guide the wire rope 1 unwound from the drum 101 to the lower portion of the main body 100.

The fixing instrument 120 is configured to apply the force to any one of the upper contact point 109 and the lifting body 200 in a state where the lifting body 200 is moved up by winding the wire rope 1 and is coupled to the main body 100, so that the lifting body 200 comes into close contact with the stopper 106. For this purpose, a metal plate 210 is fixed around the lifting body 200, and the fixing instrument 120 includes a second driving motor 121 accommodated in a tubular housing 122 and fixed to the main body 100, and a screw bolt 124 rotated by the second driving motor 121 and coupled to a screw nut 123 to move forward and backward in a vertical direction.

By forward rotation of the second driving motor 121, the screw bolt 124 moves forward (downward) and compresses the lifting body 200, or a portion connected to the lifting body 200, downward at a predetermined point to push the lifting body 200 so as to be in close contact with the stopper 106. FIG. 1 shows a configuration in which the screw bolt 124 pushes the lifting body 200 downward by compressing the metal plate 210, which is a portion connected to the lifting body 200.

If the screw bolt 124 moves backward (upward) due to the backward rotation of the second driving motor 121, the screw bolt 124 is separated from the metal plate 210 and releases the fixation by removing the force applied to the lifting body 200.

As a modification of the present disclosure, the screw bolt 124 may also be configured to move forward and backward in the horizontal direction to selectively compress the lifting body 200 so that the lifting body 200 comes into close contact with the stopper 106. As an alternative, the screw bolt 124 may be replaced by a predetermined wedge structure having an inclined surface formed at a front portion thereof, so that, when moving forward, the wedge structure pushes the lifting body 200 to be in close contact with the stopper 106.

The fixing instrument 120 is fixed to a side of the main body 100, and it is preferable that a plurality of fixing instruments 120 are arranged at sides of the main body 100 symmetrically with respect to the center of the main body 100 and operated simultaneously to press the lifting body 200 in all directions.

When fixing the lifting body 200, the fixing instrument 120 instantly operates the second driving motor 121 with a first power that is a high power so that the screw bolt 124 starts moving downward, and then, the fixing instrument 120 moves the screw bolt 124 downward with a second power that is a relatively low power to press the metal plate 210. Similarly, when releasing the fixation of the lifting body 200, the fixing instrument 120 instantly operates the second driving motor 121 with a first power that is a high power so that the screw bolt 124 starts moving upward, and then, the fixing instrument 120 moves the screw bolt 124 upward with a second power that is a relatively low power to restore the screw bolt 124. Here, the first power is preferably set to about twice the second power. If the first power is set to be higher than the second power, the screw bolt 123 instantly rotates strongly and overcomes the friction with the screw nut 123 to move upward without being stuck to the screw nut 123.

Figure 2:
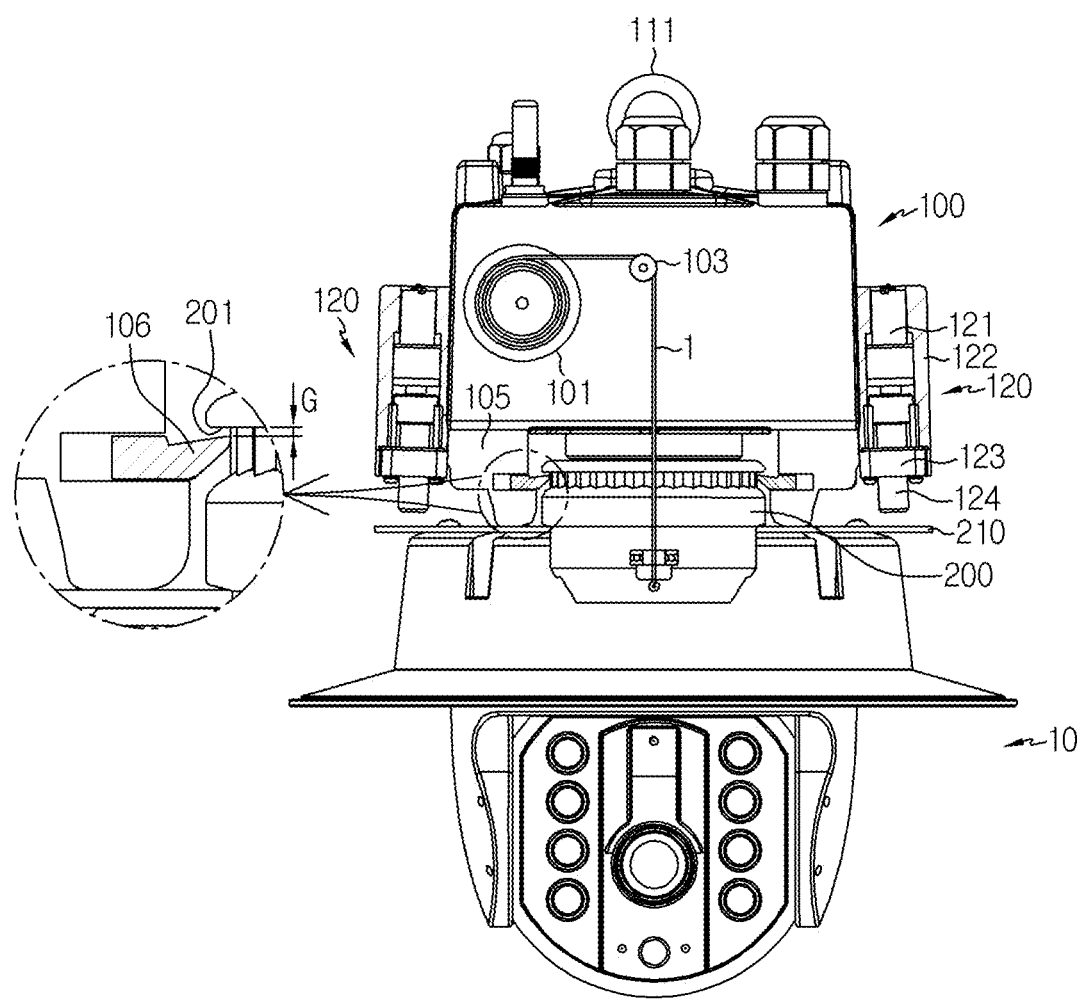
FIG. 2 is a side view showing a state where a screw bolt is moved backward to be restored in FIG. 1.

The screw bolt 124 is connected to a rotary shaft of the second driving motor 121 and disposed perpendicular to the ground. In order to omit the complicated gear assembly for transmitting a rotating force between the second driving motor 121 and the screw bolt 124, it is preferable that the second driving motor 121 and the screw bolt 124 are moved upward and downward integrally when the fixing instrument 120 is operated. For this purpose, the screw nut 123 is fixed to a lower portion of the tubular housing 122 installed to the side of the main body 100, the second driving motor 121 and the screw bolt 124 are disposed inside the tubular housing 122, and the screw bolt 124 is fitted into the screw nut 123 to move integrally. In order to prevent the second driving motor 121 from running idle inside the tubular housing 122, the second driving motor 121 preferably has a non-circular circumferential surface. FIG. 2 shows an example where the second driving motor 121 and the screw bolt 124 are moved up integrally.

Figure 4:
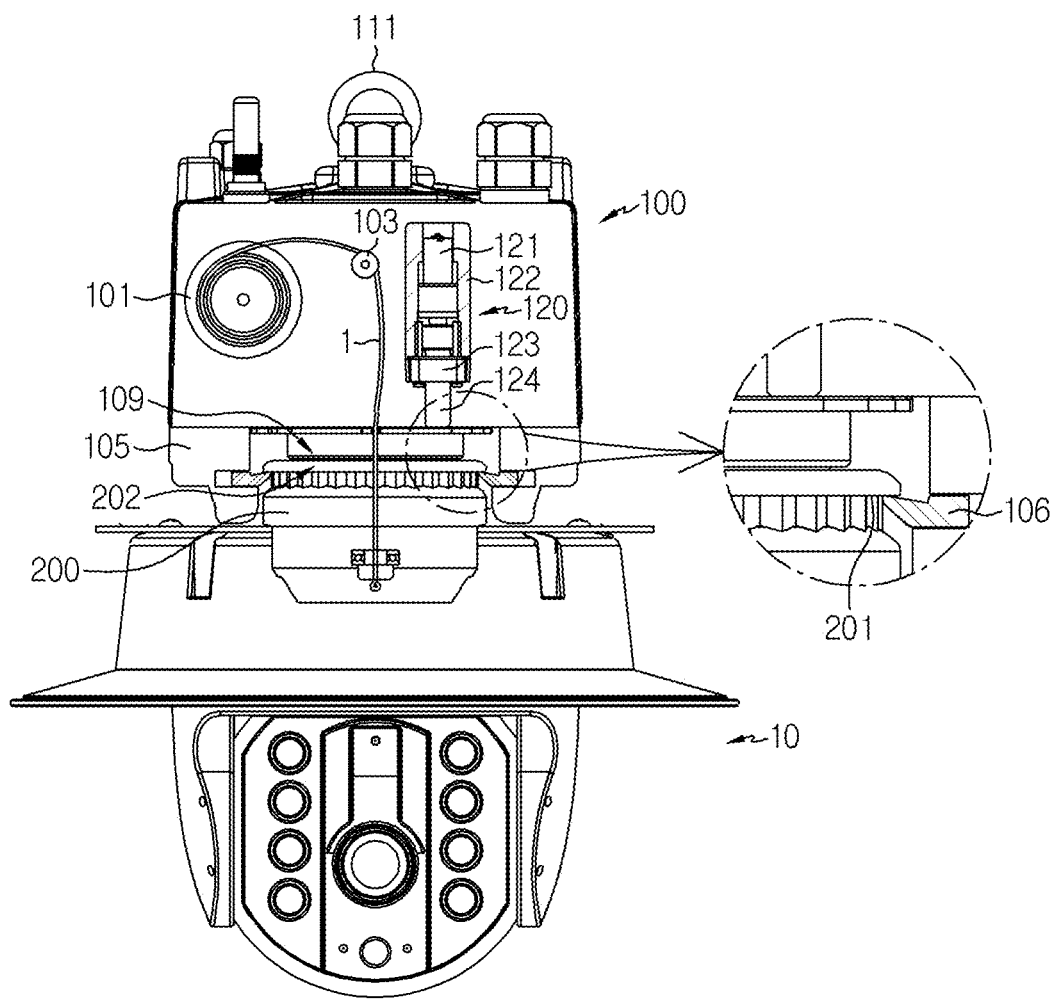
FIG. 4 is a side view showing a lifting apparatus for a highly-mounted device according to another embodiment of the present disclosure.
Figure 5:
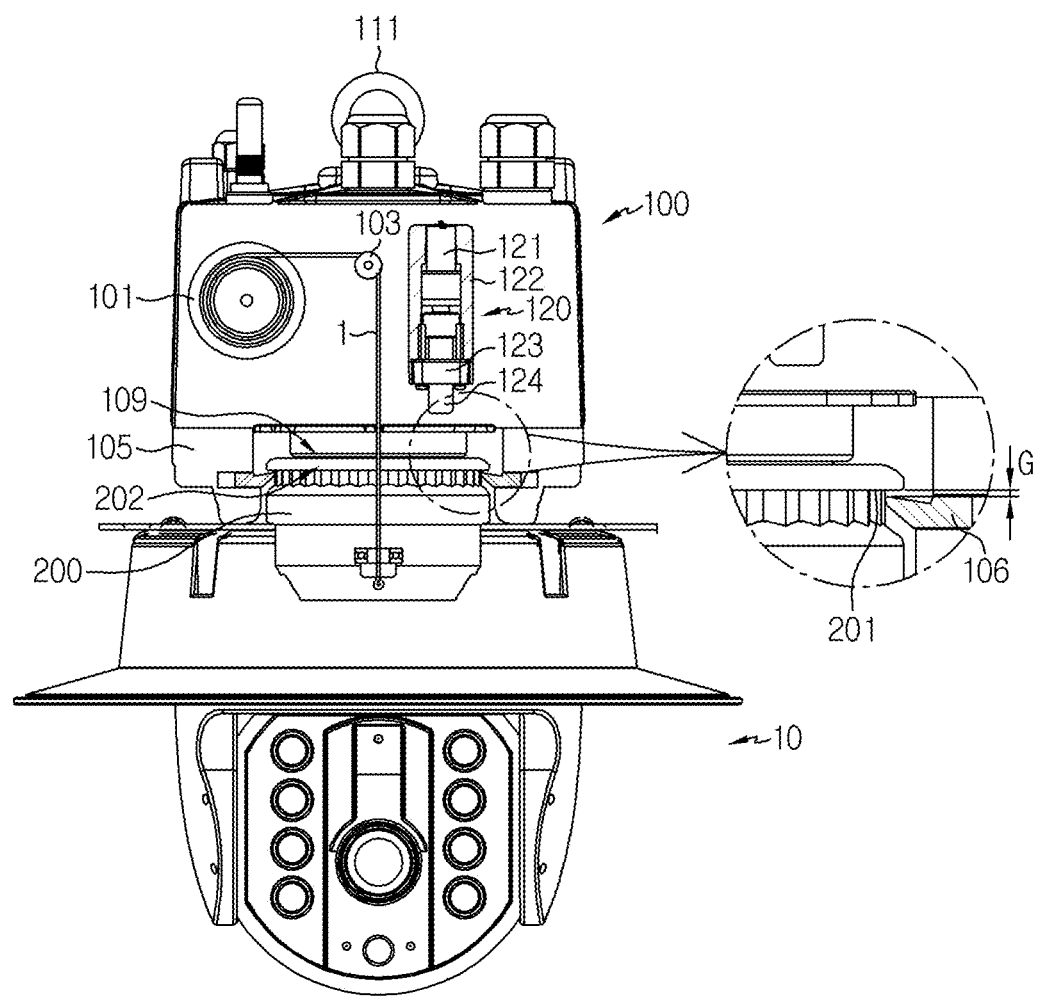
FIG. 5 is a side view showing a state where screw bolt is moved backward to be restored in FIG. 4.
Figure 6:
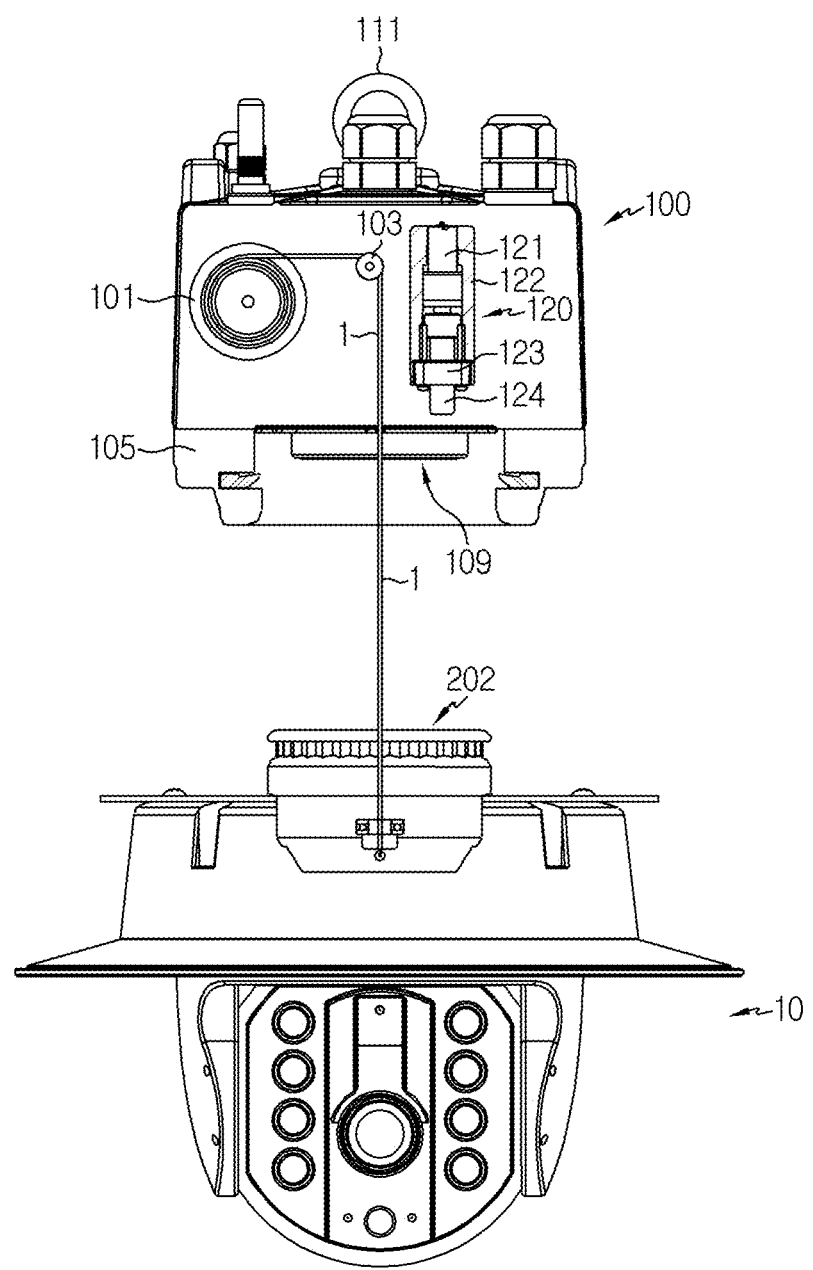
FIG. 6 is a side view showing a state where a lifting body is moved down in FIG. 5.

FIGS. 4 to 6 show an embodiment in which the fixing instrument 120 is installed inside the main body 100 to apply a force to the upper contact point 109 so that the lifting body 200 comes into close contact with the stopper 106. In this embodiment, since the screw bolt 124 presses the upper contact point 109, the fixing instrument 120 pushes the lifting body 200 downward together with the lower contact point 202 in contact with the lower portion of the upper contact point 109 so as to be in close contact with the stopper 106. At this time, the upper contact point 109 preferably is located at a lower end of the main body 100 and is installed to be elastically movable upward and downward as much as at least a gap G by a predetermined elastic body. That is, the upper contact point 109 is installed to apply an elastic force in the restoring direction when being pressed by the screw bolt 124 and moved downward.

The fixing instrument 120 includes a second driving motor 121 accommodated in the tubular housing 122 and fixed to the main body 100, and a screw bolt 124 rotated by the second driving motor 121 and coupled with the screw nut 123 to move upward and downward in the vertical direction. As an alternative, the screw bolt 124 may also be configured to move forward and backward in the left and right direction to selectively compress the upper contact point 109 so that the lifting body 200 comes into close contact with the stopper 106. As another alternative, the screw bolt 124 may also be replaced by a predetermined wedge structure having an inclined surface formed at a front portion thereof, so that, when moving forward, the wedge structure pushes the upper contact point 109 to bring the lifting body 200 into close contact with the stopper 106.

In the lifting apparatus for a highly-mounted device configured as above according to a preferred embodiment of the present disclosure, when the lifting body 200 ascends and is coupled with the main body 100 by winding the wire rope 1, the upper contact point 109 and the lower contact point 202 make contact with each other so that power is supplied to the highly-mounted device 10 mounted to the lifting body 200.

The operation of winding the wire rope 1 is performed by the drum 101 that rotates in a forward direction by the first driving motor installed in the main body 100. At this time, the wire rope 1 is pulled up while passing through the hollow of the accommodation structure 105, and then changes its moving direction by the guide roll 103 and is wound around the drum 101.

When the lifting body 200 ascends and reaches a predetermined point by winding the wire rope 1, the arrival state is detected by a predetermined limit switch (not shown), and the rotation of the drum 101 is stopped according to the detection signal. In addition, the suspending protrusion 201 provided at the upper end of the outer peripheral surface of the lifting body 200 is caught by the stopper 106 protruding from the inner wall of the receiving structure 105 of the coupling unit 104, thereby fixing the lifting body 200 to the main body 100.

When the lifting body 200 is moved up and reaches a given point by winding the wire rope 1, as shown in FIG. 2 or 5, the load of the lifting body 200 is applied to the wire rope 1 so that the wire rope 1 keeps a tight state and the stopper 106 moving forward is inserted into the suspending protrusion 201 with the gap G.

Subsequently, as shown in FIG. 1 or 4, the fixing instrument 120 moves the screw bolt 124 downward to directly or indirectly press the lifting body 200 downward so that the suspending protrusion 201 comes into close contact with the stopper 106. Thus, it is possible to prevent the lifting body 200 from being shaken and reduce the risk of performance deterioration or fall of the highly-mounted device 10.

When the lifting body 200 is inserted into and fixed to the accommodation structure 105, the upper contact point 109 and the lower contact point 202 are in contact with each other and electrically connected. Here, the contact between the upper contact point 109 and the lower contact point 202 is made in the hollow of the accommodation structure 105.

When cleaning or replacing the highly-mounted device 30, first, as shown in FIG. 2 or 5, the screw bolt 124 of the fixing instrument 120 is moved upward to be restored, thereby releasing the force pressing the lifting body 200.

Figure 3:
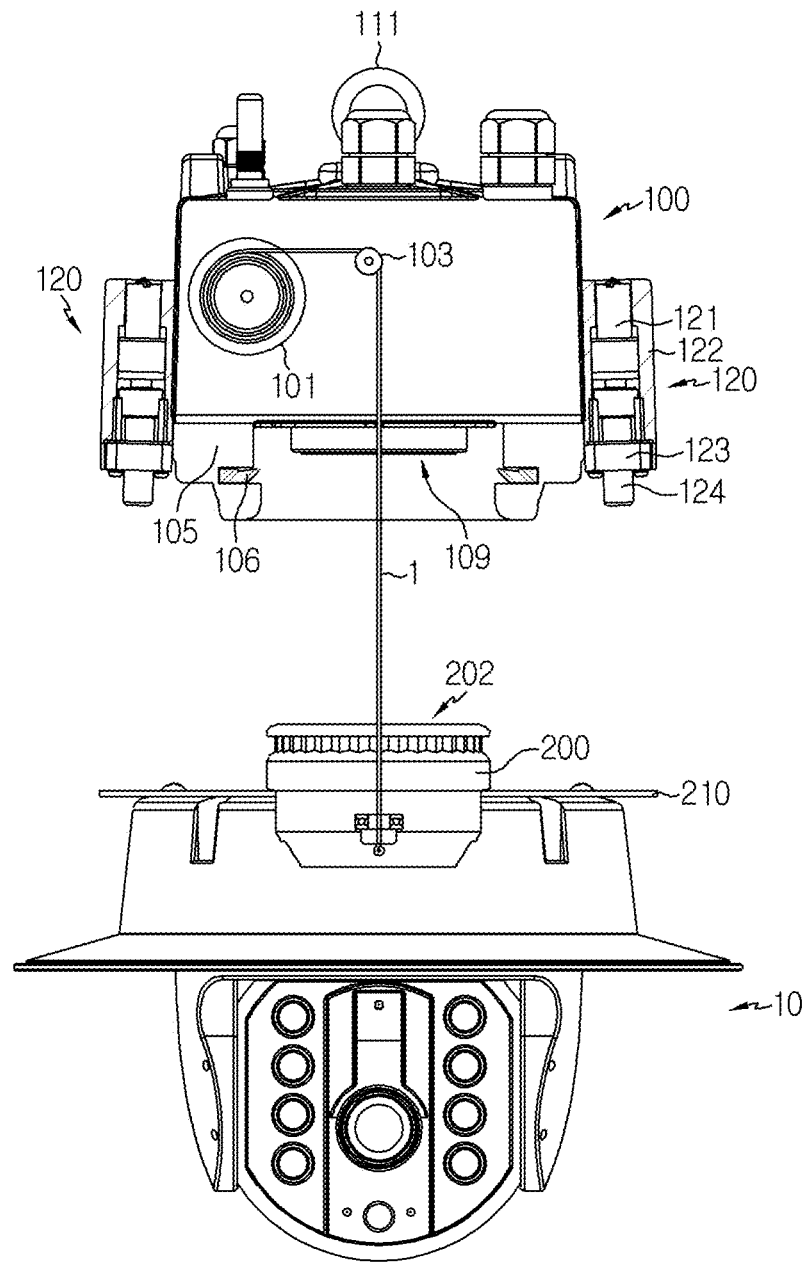
FIG. 3 is a side view showing a state where a lifting body is moved down in FIG. 2.

Next, the stopper 106 is moved backward to release the stopping state of the stopper 106 to the lifting body 200, and then the drum 101 is rotated in the rearward direction to release the wire rope 1 through the hollow of the accommodation structure 105 so that the lifting body 200 is lowered to the ground as shown in FIG. 3. In order to release the stopping state of the stopper 106, the drum 101 may be driven to lift the lifting body 200 upward a little by rotating in a forward direction as much as a predetermined interval. By this process, the stopper 106 deviates from the suspending protrusion 201 of the lifting body 200 and returns to its original position, and accordingly the lifting body 200 may come into a state capable of freely descending.

As described above, in the lifting apparatus for a highly-mounted device according to the present disclosure, when the highly-mounted device 10 is completely moved upward, the lifting body 200 is substantially pushed downward by the screw bolt 124 of the fixing instrument 120 so that the suspending protrusion 201 at the upper end of the lifting body 200 is in close contact with the stopper 106, thereby preventing the lifting body 200 from being shaken and reducing the risk of performance deterioration or fall of the highly-mounted device.

INDUSTRIAL APPLICABILITY

If the present disclosure is applied, it is possible to prevent the lifting body from shaking, thereby reducing the risk of performance deterioration or fall of the highly-mounted device and improving the contact reliability between the upper contact point and the lower contact point.

What is claimed is:

1. A lifting apparatus for a highly-mounted device, comprising:
   a main body installed at a predetermined height so that a drum for winding a wire rope and a first driving motor for giving a rotating force to the drum are installed thereto;
   a lifting body suspended from the wire rope and having a device coupling portion provided at a lower end thereof;
   an accommodation structure located at a lower portion of the main body and having an open lower portion so as to be coupled with the lifting body;
   a stopper installed at the accommodation structure and caught by a suspending protrusion provided to the lifting body to give an anti-falling function for the lifting body;
   an upper contact point and a lower contact point respectively installed at the main body and the lifting body to make contact with each other when the lifting body is moved up and coupled to the main body by winding the wire rope;
   at least one guide roll attached to the main body to support the wire rope unwound from the drum and guide the unwound wire rope into the accommodation structure; and
   a fixing instrument configured to apply a force to the lifting body in a state where the lifting body is moved up and coupled to the main body by winding the wire rope, so that the lifting body comes into close contact with the stopper,
   wherein the fixing instrument includes a second driving motor fixed to the main body, and a screw bolt rotated by the second driving motor and coupled to a screw nut to be movable forward and backward in an upper and lower direction, and wherein when the screw bolt moves forward, the screw bolt compresses the lifting body, or a portion connected to the lifting body, to push the lifting body downward so that the lifting body comes into close contact with the stopper.

2. The lifting apparatus for a highly-mounted device according to claim 1, further comprising an additional fixing instrument, wherein the fixing instrument and the additional fixing instrument are arranged at sides of the main body symmetrically based on the center of the main body to operate simultaneously.

3. The lifting apparatus for a highly-mounted device according to claim 1, wherein when fixing the lifting body, the fixing instrument instantly operates the second driving motor with a first power that is a high power so that the screw bolt starts moving downward, and then the fixing instrument moves the screw bolt downward with a second power that is a relatively low power to press the lifting body, and wherein when releasing the fixation of the lifting body, the fixing instrument instantly operates the second driving motor with the first power that is a high power so that the screw bolt starts moving upward, and then the fixing instrument moves the screw bolt upward with the second power that is a relatively low power to restore the screw bolt.

4. The lifting apparatus for a highly-mounted device according to claim 1, wherein at least one selected from a CCTV camera, a light, a fire detector and a promotional banner is coupled to the device coupling portion.

* * * * *